United States Patent [19]
Kang et al.

[11] Patent Number: 5,432,815
[45] Date of Patent: Jul. 11, 1995

[54] DATA MODULATOR-DEMODULATOR APPARATUS OF A SPREAD SPECTRUM COMMUNICATION SYSTEM

[75] Inventors: Dae-Sun Kang, Suwon; Ik-Jae Yoon, Kwacheon, both of Rep. of Korea

[73] Assignee: SamSung Electronics Co., Ltd., Suwon, Rep. of Korea

[21] Appl. No.: 266,864

[22] Filed: Jul. 5, 1994

[30] Foreign Application Priority Data

Sep. 18, 1993 [KR] Rep. of Korea .............. 18944/1993

[51] Int. Cl.⁶ ............................................. H04L 27/30
[52] U.S. Cl. ........................................ 375/200; 380/34
[58] Field of Search ......................... 375/1; 380/34, 48

[56] References Cited

U.S. PATENT DOCUMENTS

| | | | |
|---|---|---|---|
| 4,392,220 | 7/1983 | Hirosaki et al. | 375/1 X |
| 4,481,640 | 11/1984 | Chow et al. | 375/1 |
| 4,641,322 | 2/1987 | Hasegawa | 375/1 |
| 4,864,586 | 9/1989 | Endo | 375/1 |
| 5,073,899 | 12/1991 | Collier et al. | 375/1 |
| 5,132,986 | 7/1992 | Endo et al. | 375/1 |

OTHER PUBLICATIONS

G. E. Friend et al, *Understanding Data Communications;* Chap. 5, pp. 5–1 through 5–27; Howard W. Sams & Co.; Indianapolis, 1984.

*Primary Examiner*—Bernarr E. Gregory
*Attorney, Agent, or Firm*—Robert E. Bushnell

[57] ABSTRACT

In performing data communication between a subscriber terminal and a scanner of a remote information processing system, there is provided a data modulator-demodulator apparatus of a pseudo noise spread spectrum communication system for executing the data transmission and reception at a high speed, regardless of a voice speech use on a transmitting line. The transmitter part of the modulator-demodulator apparatus has a modulator which uses a pseudo noise code, generated by a pseudo noise code generator, to band spread real data, and the band spread data is converted to analog information by a transmitting converter for transmission over a transmitting line. The receiver part of the modulator-demodulator apparatus has a receiving converter which recovers operation clock data from the received analog signal, and converts a received analog signal to digital data. A demodulator in the receiver part then de-spreads the digital data in response to the pseudo noise code generated by the pseudo noise code generator.

20 Claims, 9 Drawing Sheets

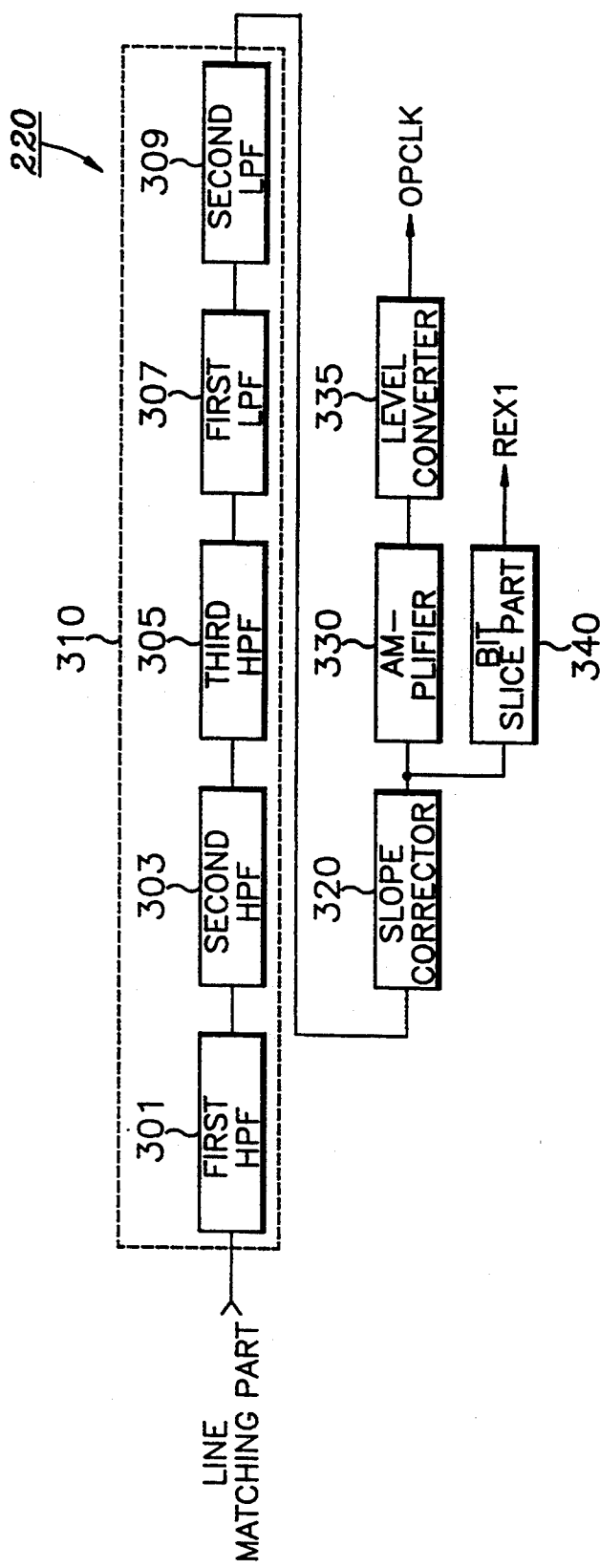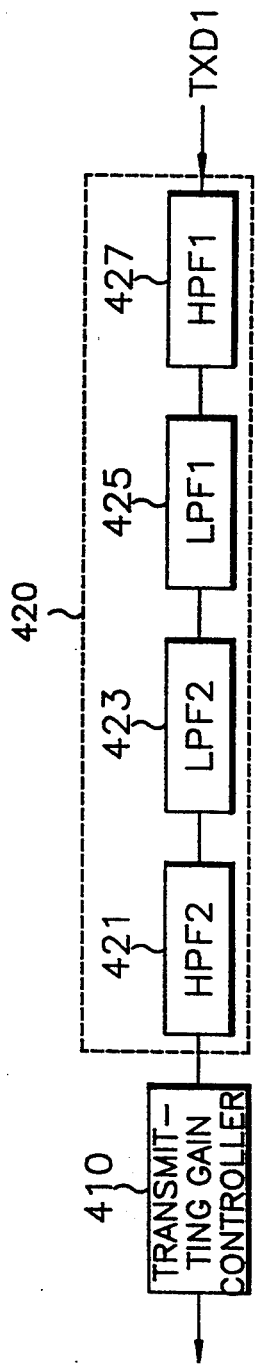
FIG. 3
FIG. 4

DATA MODULATOR-DEMODULATOR APPARATUS OF A SPREAD SPECTRUM COMMUNICATION SYSTEM

BACKGROUND OF THE INVENTION

The present invention relates to a system for processing remote information, and more particularly, to a data modulator-demodulator, process and apparatus of a spread spectrum communication system transmitting and receiving information from a subscriber terminal (a credit card inquirer, a security monitor) connected in parallel with a subscriber line through a voice speech line regardless of main communication use, and especially, to a modulator-demodulator apparatus utilizing pseudo noise codes for spread spectrum modulation and demodulation for performing a high speed data transmission and reception regardless of concurrent vocal or speech use on the transmission.

In a remote communication using a transmitting medium such as a telephone line or a power line, it is difficult to completely embody a service for processing remote information irrelevant to a conventional communication service (such as a voice service in case of the telephone line) owing to technical difficulties.

In a case of telephone line use, especially, to prevent influence upon the existing voice service, an in-phase transmission system using a ground and a transmitting system using a non-voice band off set from a voice band have been researched.

A device typically found in data communications systems is the modem. A modem is a combination modulator and demodulator, and is often also referred to as a data set, line adaptor, modulator, or subset. Regardless of the name, the purpose of each of these components is to convert digital pulses into a form compatible and suitable for transmission over a communication system. The digital pulses that represent computer-related data are distorted and attenuated or weakened by telephone lines characteristics due to direct current and VHF components, contained in the pulses, but telephone channels are only designed to transmit frequencies from about 500 Hz to 3500 Hz.

Typically, a modem converts the digital data to analog signals to fit between the telephone channel frequencies by modulation and the data is recovered by demodulating the received analog signals. This allows the data to be transmitted by telephone at high speeds without undue distortion. Modems are characterized by, among other things, the modulation technique used (acoustic modems, integral modems, etc).

To perform the data communication without having influence upon the vocal speech service in the remote information processing system, a conventional data modulator-demodulator apparatus in the remote information processing system executes a data over voice (hereinafter, referred to as "DOV") communication for performing a FSK (Frequency Shift Keying) modulation or has used a longitudinal transmission system using a ground.

The modulator-demodulator apparatus of the DOV transmission system uses the FSK modulation system to use the band over the voice band.

There is a possibility however, of creating a problem of crosstalk since the modulator-demodulator apparatus of the DOV transmission system using the FSK modulation system transmits a high level signal to implement long-distance communication.

Moreover, the modulator-demodulator apparatus of the longitudinal transmission system should be connected perfectly to the ground from a remote place and in a transmitting speed respect, there has been a problem of a slow transmitting speed due to a difficulty of high frequency use.

Furthermore, the above mentioned conventional modulator-demodulator apparatus has the problem such as a weakness in data security owing to its own non-privacy function.

Spread spectrum modulation has been employed in order to avoid a wide range of communication problems, such as, for example, interference which occurs when there are multiple propagation paths between the transmitter and receiver. A typical modem tends to interfere with itself, due to such multiple propagation paths, via delayed reception of is own signal. Two fundamental types of spread spectrum systems are direct sequence and frequency hop systems. Direct sequence spread spectrum systems use phase modulation, e.g. binary phase shift keying (BPSK) or quadrature phase shift keying (QPSK), to accomplish spreading, whereas frequency hop spread spectrum systems use a rapid changing of the carrier frequencies.

The implementation of spread spectrum systems requires the generation of spreading codes at both the transmitter and receiver, such as pseudorandom sequences. Typical pseudorandom sequences are M-series codes and Gold codes and are also known as pseudo noise codes.

One earlier technique, a *Spread Spectrum Modem* is described by Sherman M. Chow and Pok F. Lee in U.S. Pat. No. 4,481,640 uses a Hamming weighted filtered Barker code, along with the data to be transmitted, applied to a mixer to generate a spread spectrum signal in order to reduce or eliminate the effect of multipath fading. However, The Chow et al however, modem splits the digital data into even and odd bit data streams, having synchronous timing, and each pair of bits must be phase shifted by $\pi/4$ to encode clock timing into the signal for later clock recovery.

U.S. Patent No. 4,864,589 to Kaoru Endo describes *Spread Spectrum Power Line Communications* between a plurality of slave units and a single master unit wherein the slave unit must detect whether the power line is already in use as a transmission path before the slave unit can transmit to the master unit. Endo's device uses Gold codes to identify the slave units and the Gold code is applied to an exclusive-OR gate along with the data to be transmitted in order to generate a spread spectrum signal.

A more recent effort in found in *CSK Communication System* in Kaoru Endo, et al. U.S. Pat. 5,132,986 which discusses intended improvements over the spread spectrum system using a pseudo noise code and a data stream processed by an exclusive-OR gate (such as in Endo's '589 patent. The Endo, et al. system is a code shift keying spread spectrum system using a pseudo noise code to transmit a "0" bit and the same pseudo noise code being phase shifted to transmit a "1" bit, the pseudo noise codes being M-series codes. We have observed however, that the CSK system requires the use of two PN (pseudo noise) correlators in the demodulator in order to re-obtain the transmitted data.

SUMMARY OF THE INVENTION

It is therefore, an object of the present invention to provide an improved data modulator-demodulator circuit and process.

It is also an object to provide a data modulator-demodulator circuit and process for a spread spectrum communication system enabling a high speed data transmission and reception regardless of a voice speech use on a transmitting line, in executing data communication between a scanner and a subscriber terminal of a remote information processing system.

It is another object to provide the data modulator-demodulator apparatus for a spread spectrum communication system creating a privacy function for the data in during data transmission and reception.

It is an additional object to perform spread spectrum modulation on data having been error corrected, and particularly error corrected by adding parity bit data to the data information, wherein the parity bit data is generated by utilization of a well known Hamming code.

It is a further object to provide header data, synchronizing data and initial clock data to be combined with the spread spectrum signal prior to conversion to an analog signal for transmission.

These and other objects may be achieved when performing data communication between a subscriber terminal and a scanner of a remote information processing system according to the principles of the present invention, with a data modulator-demodulator process and apparatus of a pseudo noise spread spectrum communication system for executing the data transmission and reception at a high speed, regardless of simultaneous vocal or speech use on a transmission line. In accordance with the present invention, the spread spectrum communication system may minimize cross talk occurring on a non-voice band, by using this system. Further, there is an advantage capable of a bidirectional communication without having influence upon a voice speech service, since the data is transmitted in the band (over 20 KHz) separated from the voice speech band by using the band-spread frequency, not a specific frequency, namely by using all bands from 20 KHz to 100 KHz, as a signal with a minimized level. There is also provided an advantage of raising the security reliability of the remote information processing data as the data is itself endowed with a privacy function according to the foregoing spread spectrum communication system.

BRIEF DESCRIPTION OF THE DRAWINGS

A more complete appreciation of this invention, and many of the attendant advantages thereof, will be readily apparatus as the same becomes better understood by reference to the following detailed description when considered in conjunction with the accompanying drawings in which like reference symbols indicated the same or similar components, wherein:

FIG. 3 is a detailed block diagram of a receiving converter of FIG. 2.

FIG. 4 is a detailed block diagram of a transmitting converter of FIG. 2.

DETAILED DESCRIPTION OF THE PREFERRED EMBODIMENT

In the following description, numerous specific details are set forth to provide a more thorough understanding of the present invention. It will be apparent, however, to one skilled in the art, that the present invention may be practiced without these specific details. In other instances well known circuits have not been described in detail so as not to obscure the present invention.

The following is a detailed description for a configuration of the present invention referring to the attached diagrams.

Figure 1:
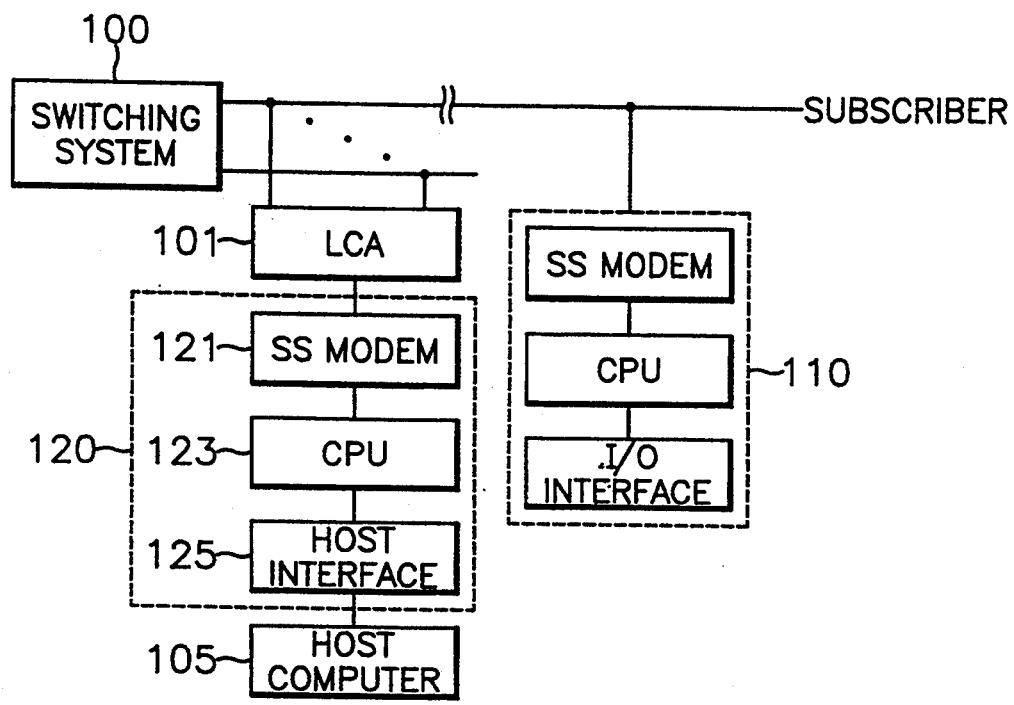
FIG. 1 is a block diagram of a system processing a remote information, including an embodiment constructed according to the principles of the present invention.

FIG. 1 is a block diagram for a system processing a remote information inclusive of the present invention and includes a switching system 100, an LCA (Line Concentration Adaptor) 101 connected to numerous transmitting lines for multiplexing a line connection, a terminal 110 connected in parallel to a transmitting line for transmitting and receiving several kinds of information, a scanner 120 connected to LCA 101 for accessing a desired terminal and for connecting to the terminal by controlling the line connection to transmit and receive the information of the terminal 110, and a host computer 105 connected to the scanner 120 for transmitting and receiving the data with the terminal 110.

The host computer 105 processes the remote information and is a main computer of the remote information processing system, which system provides communication services.

Terminal 110 is connected to a existing transmitting line (a speech line) and also to an external information processing apparatus (not shown) which provides several kinds of information. The external information processing apparatus may herewith become a sensor in case of a security management service, a meter or a terminal having information of the meter in case of a remote inspection of the meter, or a card wader for processing card information in case of a card inquiry service.

Scanner 120 is a main monitor equipment connected between host computer 105 and LCA 101. Scanner 120 accesses LCA 101 for multiplexing numerous terminals connected to a transmitting line. Also scanner 120 gathers information of the corresponding terminal and transmits it to host computer 105. Scanner 120 furthermore accesses a desired terminal and transmits the data according to a command of host computer 105.

In FIG. 1, the scanner 120 uses a host interface 125 connected to host computer 105, a CPU 123 connected to host interface 125 for controlling a whole operation of the scanner, and a spread spectrum modem 121 (hereinafter, referred to as "SS Modem") connected to CPU 123 for modulating and demodulating data via transmitted or received interface 125.

Referring now to the configuration of FIG. 1, that configuration may be briefly described for a whole service of a remote information processing system as follows.

The CPU 123 within the scanner 120 controls the SS Modem 121 and connects the corresponding terminal and the line through the LCA 101. And then the scanner 120 accesses the information of the terminal party by executing a communication with the corresponding terminal 110 and this information may be different according to a desired or selected communication service. The scanner 120 sends the accessed information to the host computer 105 to implement a corresponding service. In this time, the host computer 105 sends the information to the scanner 120 to transmit the information to the corresponding terminal 110. The scanner 120 accesses the corresponding terminal 110 and transmits to the terminal 110 the information received from the host computer 105 so that the terminal 110 party may implement the corresponding communication service.

Figure 2:
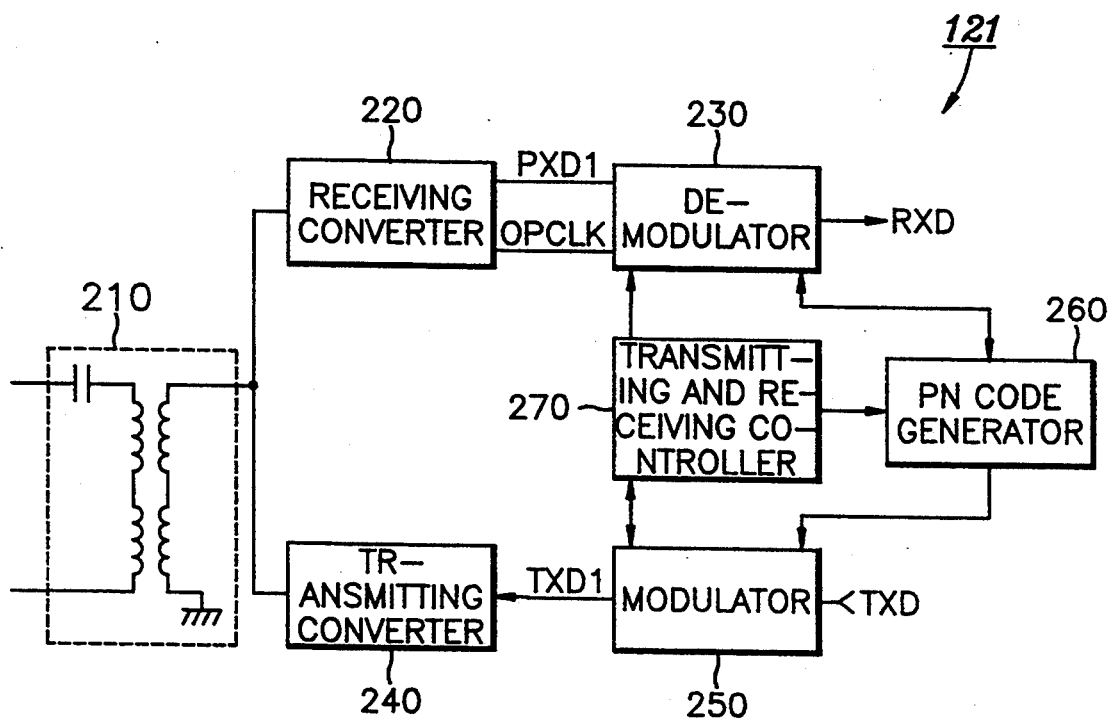
FIG. 2 is a block diagram of a data modulator-demodulator apparatus of a spread spectrum communication system of one embodiment constructed according to the principles of the present invention.

FIG. 2 is a block diagram of the SS Modem of FIG. 1 according to one embodiment of the present invention. FIG. 2 is composed of a line matching part 210 connected to the LCA 101; a transmitting and receiving controller 270 which outputs a timing control signal for controlling a modulation and demodulation timing of transmission and reception data; a PN (pseudo noise) code generator 260, which is well known in the art, generates and outputs a PN code for band spreading and de-spreading the transmission and reception data in synchronism with the timing control signal; a modulator 250 for receiving a transmitting real data (TXD) input from the CPU 123 and for modulating and outputting the data as the transmission modulation data (TXD1) including a prescribed reception information, wherein the transmitting real data (TXD) is band spread in response to the PN code; a transmission converter 240 for convening the transmitting modulation data (TXD1) into an analog information signal for output through the line matching part 210; a receiving converter 220 connected to the line matching part 210 for converting into a digital signal an analog information signal input from the terminal of a remote site, and for outputting a reception data (RXD1) and an operating clock (OPCLK) separately; and a demodulator 230 connected to the receiving converter 220 for receiving the reception data (RXD1) and the operation clock (OPCLK), and for de-spreading and demodulating the reception data (RXD1) for outputting the reception demodulation data (RXD) to the CPU 123.

FIG. 3 is a detailed block diagram of a receiving converter 220 of FIG. 2. The receiving converter 220 is made up of a receiving filter 310 for filtering a signal component from the analog signal input from the line matching part 210; a slope corrector 320 for receiving a filtered output from the receiving filter 310, and for correcting a slope of the input signal so that an A/D conversion may be progressed easily; an amplifier 330 for receiving a slope-corrected output signal from the slope corrector 320 to recover an initial clock, transmitted within the input signal, for outputting the operation clock (OPCLK) to control reception of the real data; a level converter 335 for receiving the operation clock (OPCLK) from the amplifier 330 and for converting it into a TTL level; and a bit slice part 340 for the slope-corrected output signal from the slope corrector 320 for convening it into a TTL level signal, corresponding to the input signal change, and for outputting the digital reception data (RXD1).

Further, the receiving filter 310 includes a first, a second and a third HPF (High Pass Filter) 301, 303 and 305 which remove a voice band in a reception signal, and a first and a second LPF (Low Pass Filter) 307 and 309 for removing a high frequency component from the output signal of the third HPF (305).

FIG. 4 is a detailed block diagram of the transmitting converter 240 of FIG. 2, and includes a transmitting filter 420 for convening the transmission modulation data (TXD1) input from the modulator 250 into the analog signal; and a transmitting gain controller 410 for controlling signal gain of an output signal of the transmitting filter 420 to be sent to the transmitting line.

The transmitting filter 420 couples to a DC component of a transmission modulation data (TXD1) signal input from the modulator 250, and includes a HPF (High Pass Filter) 427 for removing a low frequency component from the transmission modulation data, a LPF 425 and a LPF 423 (Low Pass Filter) for removing a high frequency component from the output of the HPF 427, and a HPF 421 for preventing a digital component of the output of the LPF 423 from being passed to the voice band.

Figure 5:
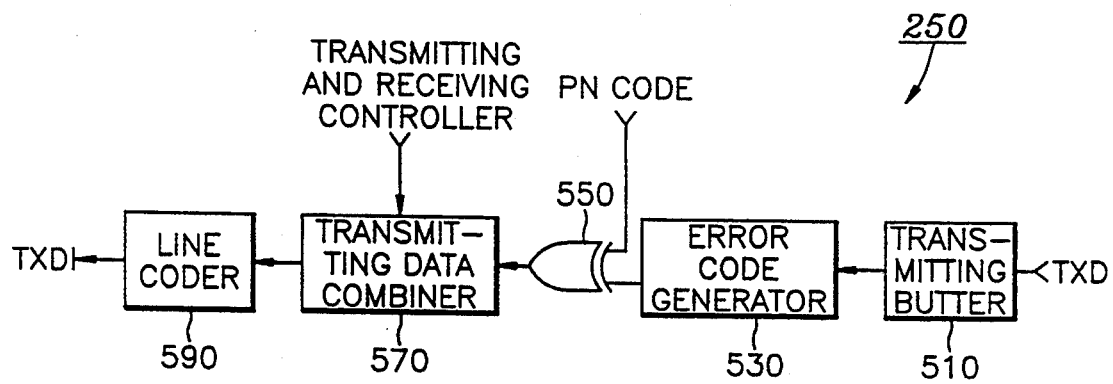
FIG. 5 is a block diagram of a modulator of FIG. 2.

FIG. 5 is a detailed block diagram of the modulator 250 of FIG. 2 and is composed of a transmitting buffer 510 for temporarily storing the transmitting real data (TXD) input from the CPU 123; an error code generator 530, connected to the output of the transmitting buffer 510, in which the error code generator 530 generates parity bit data for correcting an error of the transmitting real data and outputs serial data as a combination of the parity bit data with the transmitting real data; an Exclusive-OR logic 550 receives the PN code from the PN code generator 260 and band-spreads the output data of the error code generator 530; a transmitting data combiner 570 receives the band-spread output of the Exclusive-OR logic 550 and combines it with header data, an initial clock and a synchronizing signal in synchronism with the timing control signal input from the transmitting and receiving controller 270, in which the header data shows an existence of the real data; and a line coder 590 receives the output of the transmitting data combiner 570 corresponding to a prescribed clock signal to code the data for outputting the transmission modulation data (TXD1).

In the above configuration according to one embodiment of the present invention, it is well-known in the art that the error code generator 530 serves to generate, combine and output parity bit data of 3 bits for 4 bits of information by using a well-known 4-7-1 HAMMING code.

Figure 6:
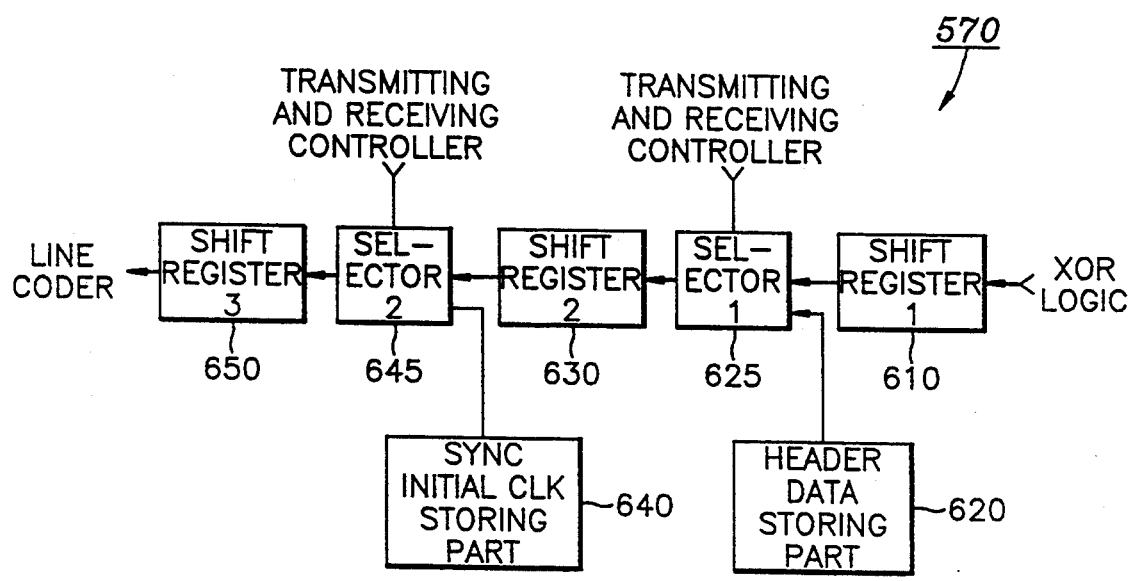
FIG. 6 is a detailed block diagram of a transmitting data combiner of FIG. 5.

FIG. 6 is a detailed block diagram of the transmitting data combiner 570 of FIG. 5 and has a shift register 610 for shift-outputting the data output from the Exclusive-OR logic 550 each by 1 bit in synchronism with the timing control signal of the transmitting and receiving controller 270; a header data storing part 620 for storing prescribed header data; a selector 625 for receiving the output of the shift register 610 and the header data output of the header data storing part 620, and selectively for outputting the input data in response to the timing control signal of the transmitting and receiving controller 270; a shift register 630 for inputting the output data of the selector 625 and for shift-outputting the data each by 1 bit; a synchronizing and initial clock storing part 640 for storing prescribed synchronizing data and the initial clock data; a selector 645 for inputting the output of the shift register 630 and the synchronizing data and the initial clock data of the synchronizing and initial clock storing part 640 for selectively outputting the data in response to the timing control signal of the transmitting and receiving controller 270; and a shift register 650 for inputting the output data of the selector 645 and for shift-outputting the data each by 1 bit.

In the above configuration, the header data storing part 620 and the synchronizing and initial clock storing part 640 may use registers for storing the prescribed data.

Figure 7A:
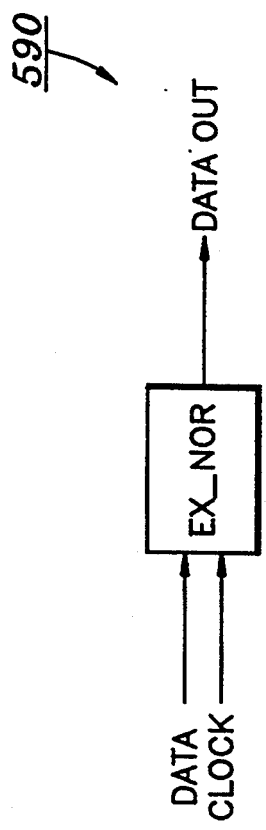
FIG. 7A is a detailed block diagram of a line coder of FIG. 5.

FIG. 7A is a detailed block diagram of the line coder 590 of FIG. 5 and includes an Exclusive-NOR logic for inputting a prescribed clock and the output data of the transmitting data combiner 570 for outputting line-coded data.

Figure 7B:
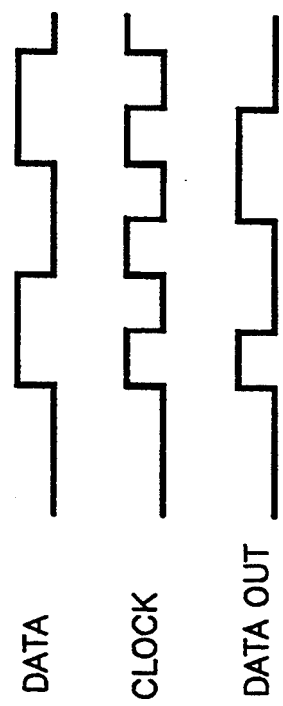
FIG. 7B is a waveform diagram of an operation of the line coder.

FIG. 7B is a waveform diagram of an operation of the line coder 590 and DATA shows an output waveform of the transmitting data combiner 570, and DATA OUT shows an output data waveform of the line coder 590.

Figure 8:
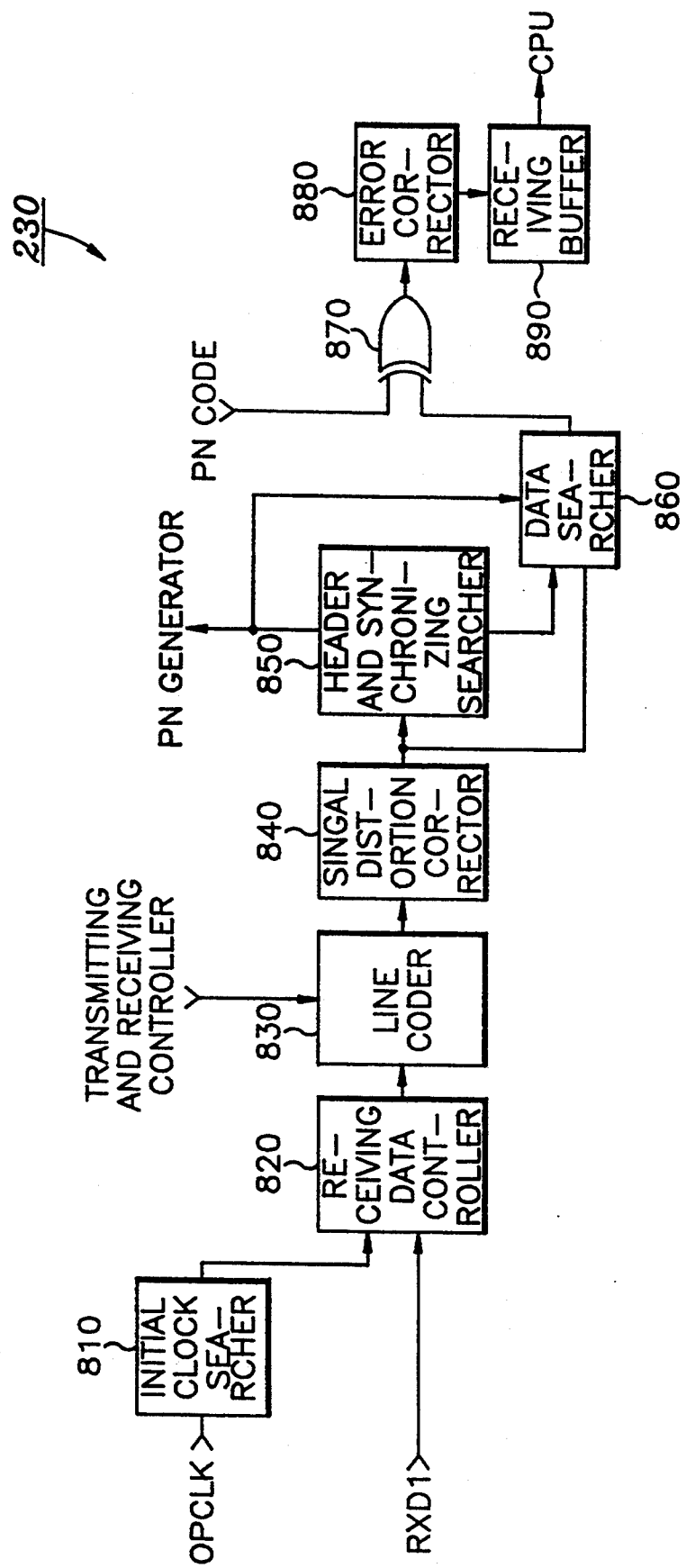
FIG. 8 is a detailed block diagram of a demodulator of FIG. 2.

FIG. 8 is a detailed block diagram of the demodulator 230 of FIG. 2 and is made up of an initial clock searcher 810 for receiving the operation clock from the receiving converter 220 to detect clock information and for outputting a reception control signal which indicates the start of the received data; a receiving data controller 820 for outputting the digital reception data (RXD1) input from the receiving converter 220 corresponding to the reception control signal input the initial clock searcher 810; a line decoder 830 for inputting the reception data (RXD1) from the receiving data controller 820, and for line decoding and outputting the reception data (RXD1) in synchronism with the timing control signal of the transmitting and receiving controller 270; a signal distortion corrector 840 for inputting the output data of the line decoder 830, and for correcting for distortion in the input data and outputting corrected data; a header and synchronizing searcher 850 for detecting the header data and synchronizing data from the corrected data output from the signal distortion corrector 840 and for outputting a detecting result; a data detector or data searcher 860 for receiving the output corrected data of the signal distortion corrector 840 for removing the header data and synchronizing data therefrom in response to the detecting result of the header and synchronizing searcher 850; an Exclusive-OR logic 870 for band de-spreading the output data of the data detector 860 in response to the PN code input from the PN code generator 260; an error corrector 880 for receiving the de-spreaded output data of the Exclusive-OR logic 870, for forward correcting error therein by using an error code within the de-spreaded output data, and for outputting the reception demodulation data (RXD); and a receiving buffer 890 for temporary storing the reception demodulation data (RXD) output from the error correction detector 880 prior to outputting the reception demodulation data to the CPU 123.

Figure 9A:
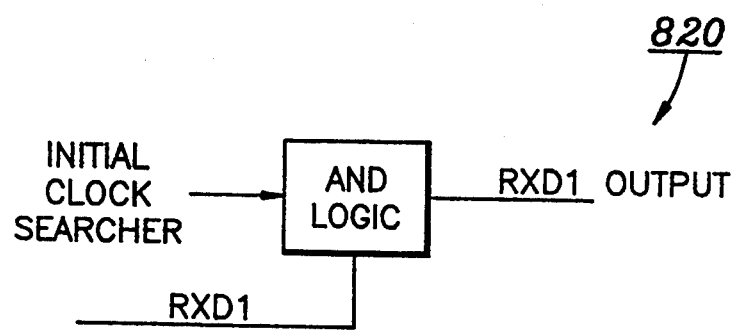
FIG. 9A is a detailed block diagram of a receiving data controller of FIG. 8.
Figure 9B:
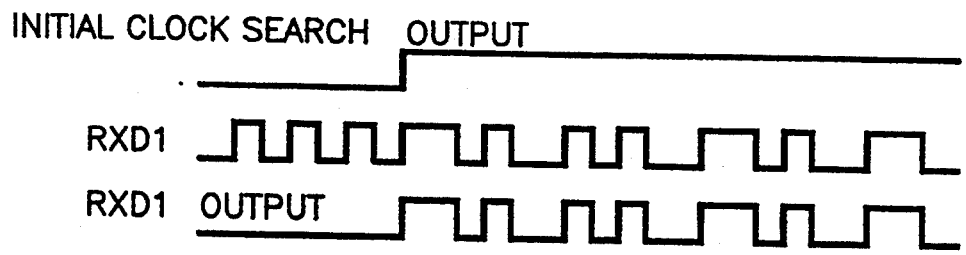
FIG. 9B is a waveform diagram of an operation of the receiving data controller.

FIG. 9A is a detailed block diagram of the receiving data controller 820 of FIG. 8 and has an AND logic. FIG. 9B is a waveform diagram of an operation of the receiving data controller 820. The AND logic receives an INITIAL CLOCK SEARCH OUTPUT signal, i.e. the reception control signal, as shown in FIG. 9B generated by the initial clock searcher 810. The AND logic also receives the reception data, for example as shown in FIG. 9B as RXD1 from the receiving converter 220, and generates the RXD1 OUTPUT as shown in FIG. 9B.

Figure 10A:
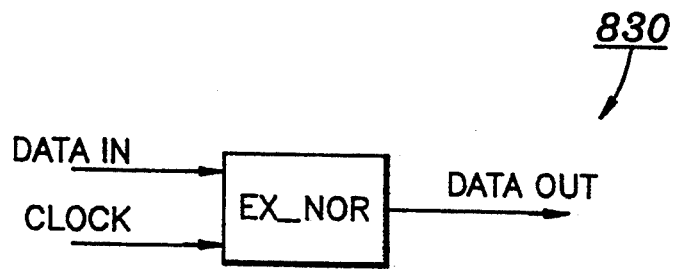
FIG. 10A is a detailed block diagram of a line decoder of FIG. 8.
Figure 10B:
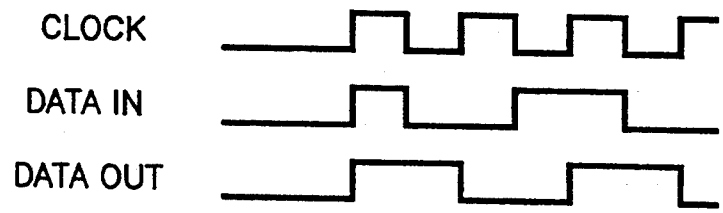
FIG. 10B is a waveform diagram of an operation of the line decoder.

FIG. 10A is a detailed block diagram of the line decoder 830 of FIG. 8 and has the Exclusive-NOR logic. FIG. 10B is a waveform diagram of an operation of the line decoder 830. The CLOCK signal in FIG. 10B is provided by the transmitting and receiving controller 270 and the DATA IN signal is representative of the RXD1 OUTPUT as shown, for example, in FIG. 9B from the receiving data controller 820. The DATA OUT is the reception data RXD1 line decoded by the Exclusive-NOR logic of line decoder 830.

Figure 11A:
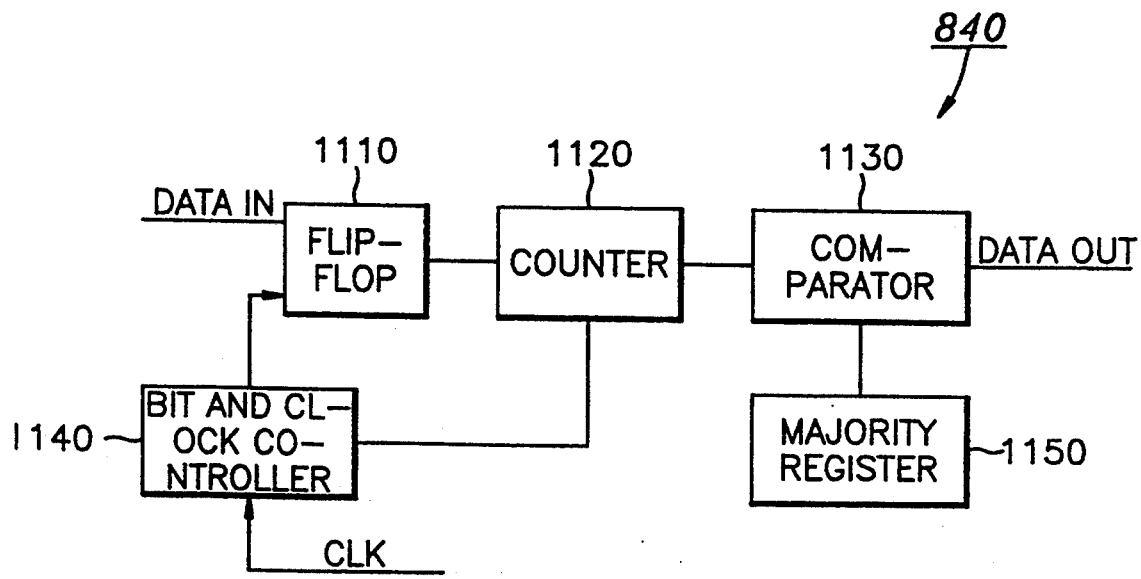
FIG. 11A is a detailed diagram of a signal distortion corrector of FIG. 8.

FIG. 11A is a detailed diagram of the signal distortion corrector 840 of FIG. 8 and is made up of a flip-flop 1110 for latching and outputting the data output from the line decoder 830 according to a prescribed period, a counter 1120 for inputting the output data of the flip-flop 1110 and for outputting a counting value corresponding to a high state input and the data, a bit and clock controller 1140 for inputting the counting value of the counter 1120 and for controlling the clock period of the flip-flop 1110, a majority register 1150 for storing numerous reference values, and a comparator 1130 for outputting the result by comparing with the output of the counter 1120 and a storing data of the majority register 1150.

Figure 11B:
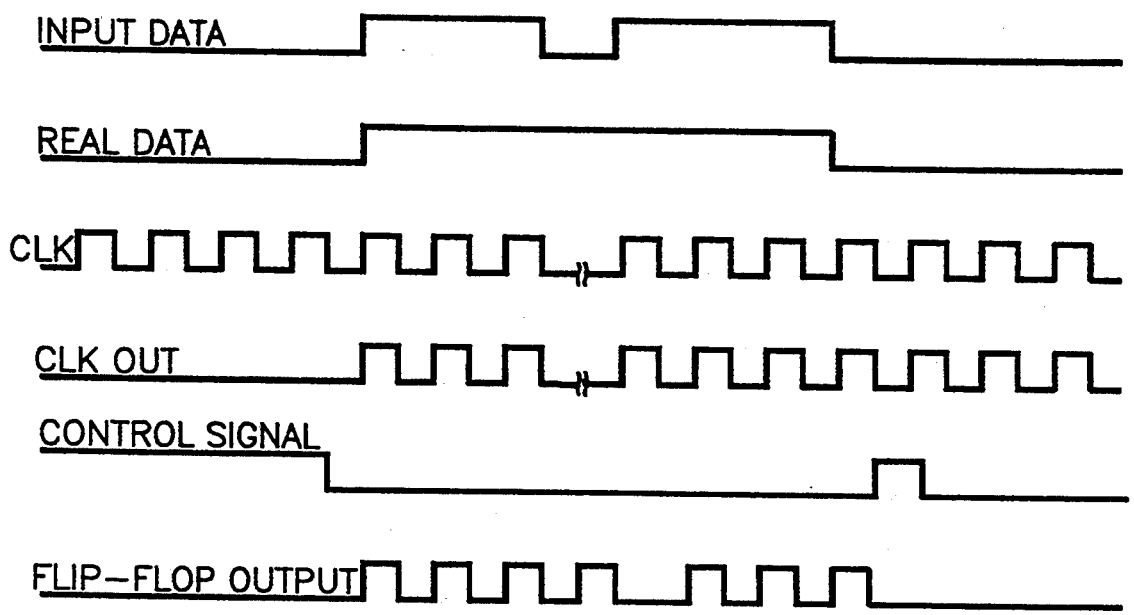
FIG. 11B is a waveform diagram of an operation of the signal distortion corrector.

FIG. 11B is a waveform diagram of an operation of the signal distortion corrector 840, wherein the INPUT DATA corresponds to the DATA IN shown in FIG. 11A and is the signal received from line decoder 830; REAL DATA corresponds to the output signal of the signal distortion corrector 840; CLK OUT is one output of the bit and clock controller 1140 in response to the CLK input; CONTROL SIGNAL is a signal input to reset counter 1120 and is the other output of the bit and clock controller 1140; and FLIP-FLOP OUTPUT is supplied to an input of counter 1120 and is the result and output of the flip-flop 1110 latching the DATA IN in response to the CLK OUT of the bit and clock controller 1140.

Figure 12:
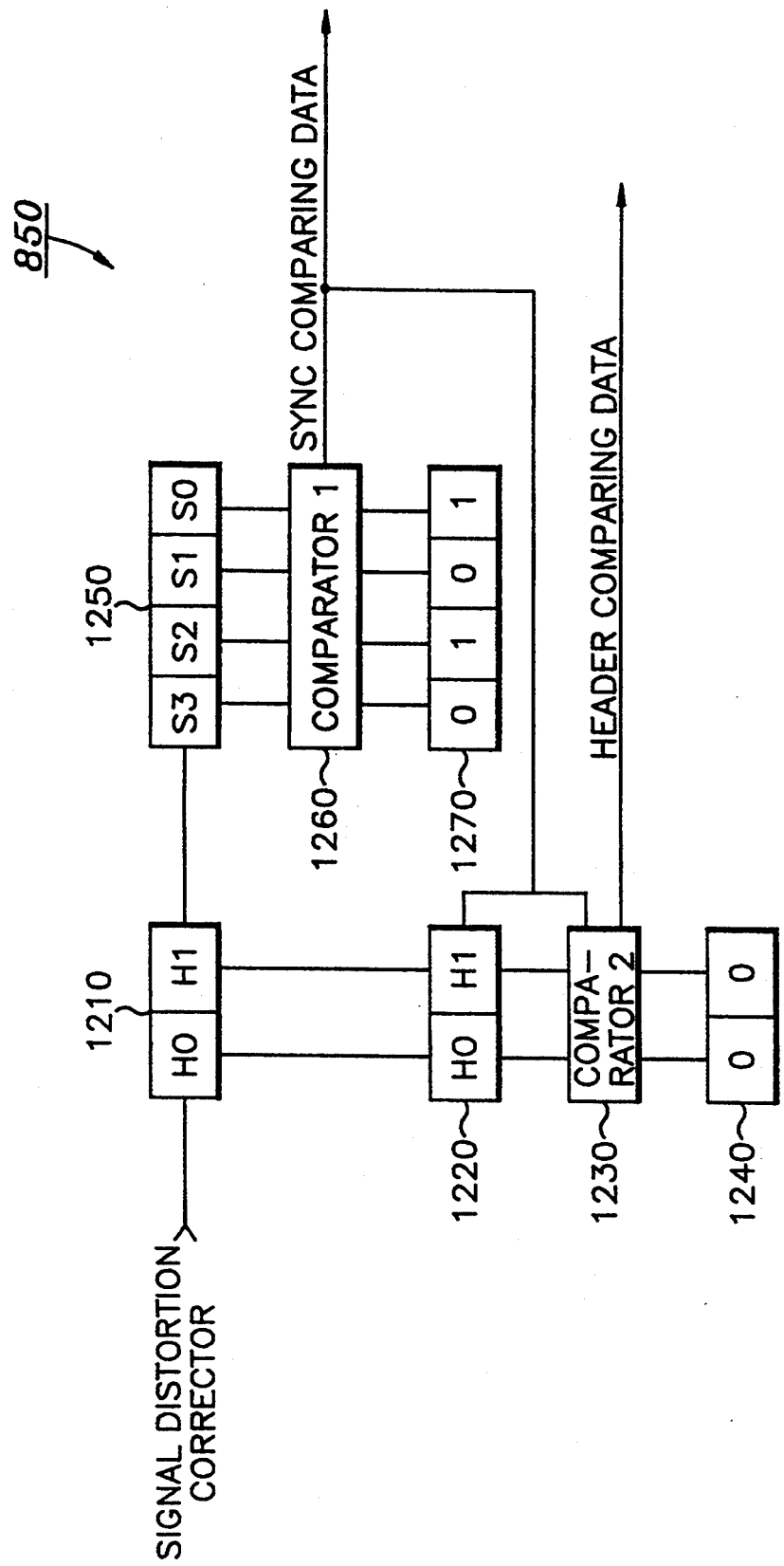
FIG. 12 is a detailed diagram of a header and synchronizing searcher of FIG. 8.

FIG. 12 is a detailed diagram of the header and synchronizing detector 850 of FIG. 8 and is composed of a first shift register 1250 and a second shift register 1210 which receive the output data of the signal distortion corrector 840 as shift input each by 4 bits and by 2 bits to store temporarily, a synchronizing data storing part 1270 for storing a prescribed synchronizing data (101011 as an example), a comparator 1260 for comparing the data stored in the first shift register 1250 with the synchronizing data and for outputting the synchronizing comparing data corresponding to the comparing result, a register 1220 temporarily for storing shift-output data from the second shift register 1210 corresponding to the synchronizing comparing data, a header data storing part 1240 for storing a prescribed header data (1001 as an example), and a comparator 1230 which inputs a storage data and the header data of the register 1220 and the synchronizing comparing data, which compares the two input data (the storage data and the header data) corresponding to the synchronizing comparing data, and which outputs the header comparing data corresponding to the comparing result.

Figure 13:
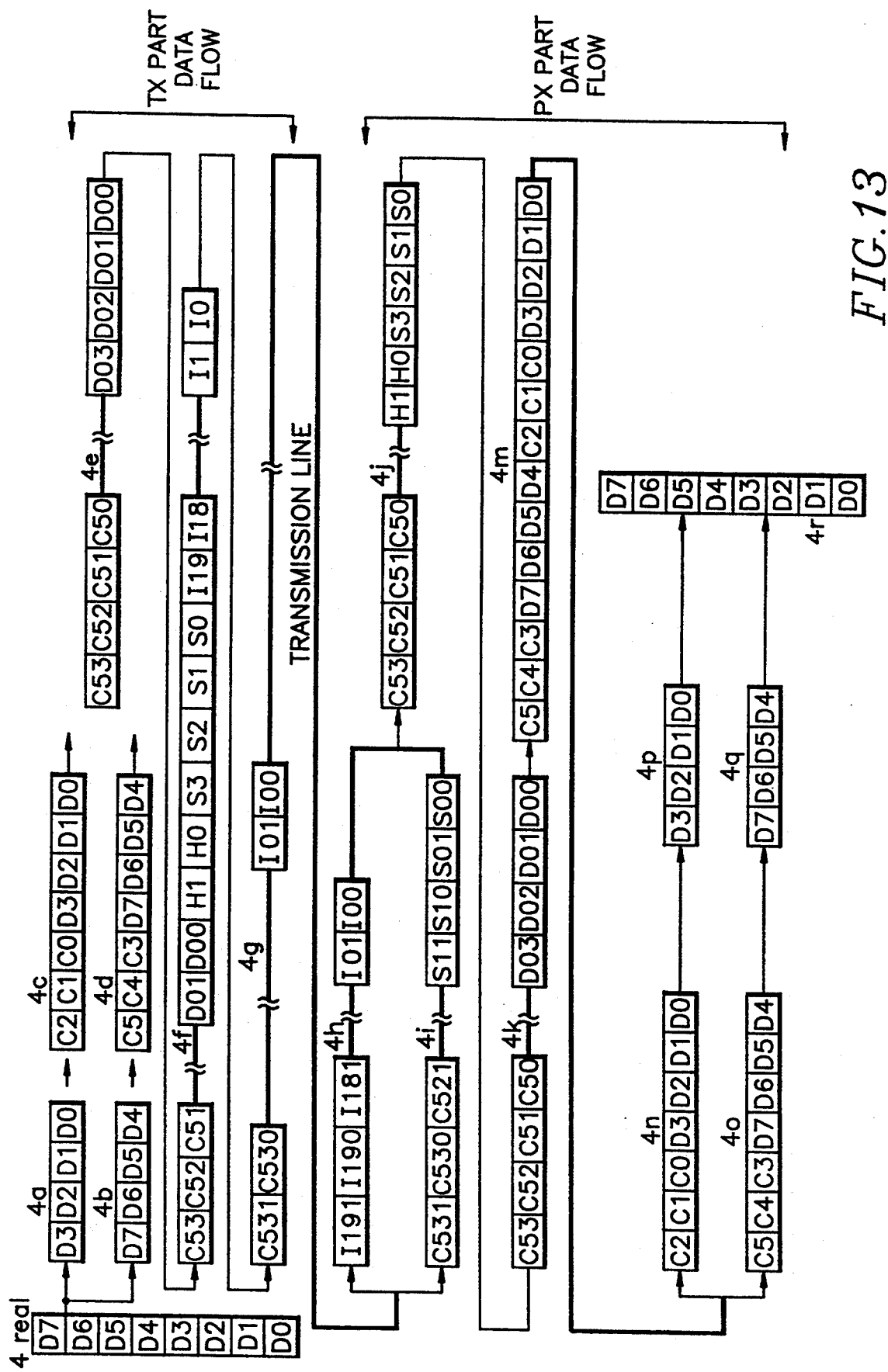
FIG. 13 is a phase diagram of changing a data format showing that 8 bits real data being modulated and transmitted as 164 bits, and being demodulated to the 8 bits real data, in a data modulator-demodulator apparatus of a spread spectrum communication system of one embodiment constructed according to the principles of the present invention.

FIG. 13 is a phase diagram for showing a changing state of data format which a transmission-desired 8 bits real data is modulated and transmitted as 164 bits data and the 164 bits data is again demodulated to the 8 bits real data, in the SS Modem according to one embodiment of the present invention.

Referring to FIG. 13, the embodiment of the present invention is described in details, as follows.

The transmitting buffer 510 stores the real data of 8 bits each by 4 bits (D0-D3: 4a, D4-D7: 4b), which the 8 bits real data is parallel transmitted from the CPU 123, and then the transmitting buffer 510 serially outputs the real data (D0-D3: 4a, D4-D7: 4b) stored in the interior. In the embodiment of the present invention, as an example, the transmission for the real data of 8 bits is described.

The error code generator 530 receives an input of the real data output from the transmitting buffer 510, generates and combines 3 bits parity bit (C0-C2, C3-C5) with 4 bits information by using the 4-7-1 HAMMING code, and outputs 4c and 4d data.

The exclusive-OR logic 550 as the PN code combination means inputs the 4c and 4d data and band-spreads with the PN code to output a 4e data (D00-C53) of 56 bits. That is, if data C0-C2 is added to D0-D3 and data C3-C5 to D4-D7, in this time, with the PN code 1 bit information is band-spread each to 4 bits information (from DO to D00, D01, D02 and D03 of the 4 bits).

The shift register 610 as shown in FIG. 6 in the transmitting data combiner 570 receives the input of the band-spread 4e data each by 1 bit. In this time, the transmitting and receiving controller 270 controls an output format of the transmitting data combiner 570 through the timing control. The transmitting and receiving controller 270 controls the selector 645 and firstly outputs to the shift register 650 the initial clock signal from the synchronizing and initial clock storing part 640, than the 4e data. When the output of the initial clock data is finished, the transmitting and receiving control part 270 also outputs a synchronizing data from the synchronizing and initial clock storing part 640 and then controls the selector 625 to output the header data from a header data storing part 620. When the outputs of the initial clock and of the synchronizing data and header data are finished, the transmitting data combiner 570 outputs 4f data of serial 82 bits having a reception information, by outputting the 4e data. The reception information suggests the initial clock, the synchronizing data and the header data as I0-I19, S0-S3 and H0-H1, respectively.

The line coder 590 inputs the 4f data having the reception information and line-codes the data corresponding to the prescribed clock signal. With the Exclusive-NOR logic of FIG. 7A, the line coder 590 line codes the input data in synchronism with the clock as shown in FIG. 7B and outputs a 4g data of 164 bits, namely the transmission modulation data (TXD1). The line coding, in this time, is to prevent the continued information of "1" or "0". Therefore, an information amount transmitted to an actual line becomes 164 bits information. Twenty initial clocks (10-I19) are transmitted on the actual line as mentioned above since the initial clock sends the same information of 20 bits.

The transmitting filter 420 within the transmitting converter 240 inputs the transmission modulation data (TXD1) and converts it into the analog signal. In this operation, the HPF 427 couples the DC component of the transmission modulation data (TXD1) signal to remove the low frequency component. The LPF 425 and LPF 423 remove the high frequency component from the output of the HPF 427. The HPF 421 filters a passing of the digital component to the voice band from the output of the LPF 423.

The transmitting gain controller 410 controls the signal size to send the output signal of the transmitting filter 420 to the transmitting line and outputs the signal to the transmitting line through the line matching part 210.

The operations of the receiving converter 220 and of the demodulator 230 are described according to the embodiment of the present invention as follows.

The receiving filter 310 within the receiving converter 220 filters the signal component from the analog information signal input from the line matching part 210. Namely the first, second and third HPF 301, 303 and 305 remove the voice band from the analog information signal and pass only the signal component.

The first and second LPF as 307 and 309 remove the high frequency component over the signal component in the output signal of the third HPF 305.

The slope corrector 320 inputs the output of the receiving filter 310, corrects the slope of the input signal to easily perform the A/D conversion and outputs it.

The amplifier 330 amplifies the output signal of the slope corrector 320.

The level converter 335 outputs the amplified signal as the operation clock (OPCLK) according to the TTL, level.

The bit slice part 340 inputs the output signal of the slope corrector 320 to convert the signal into the digital reception data (RXD1) according to the TTL, level, and outputs it.

The initial clock searcher 810 within the demodulator 230 inputs the operation clock (OPCLK), namely 4h data 0191-I00), input from the level converter 335 and detects the clock information, and corresponding to the detecting result, outputs the reception control signal which shows whether the reception data (RXD1) is detected.

The receiving data controller 820 inputs the reception data (RXD1) from the receiving converter 220 and outputs the reception data (RXD1), namely 4i data(S00-C531), corresponding to the reception control signal of the initial clock searcher 810.

The line decoder 830 inputs the reception data (RXD1) from the receiving data controller 820 and outputs the decoding data ('data out') as shown in FIG. 10B, namely 4j data, corresponding to the prescribed clock signal, through the Exclusive-NOR logic as shown in FIG. 10A. In this prescribed clock, the timing control signal of the transmitting and receiving controller 270 is used.

The signal distortion corrector 840 corrects the distortion of the input signal according to a prescribed reference value.

For the above correction procedure, it is described in details referring to the timing diagram of FIG. 11B on the basis of the block diagram of FIG. 11A, as follows.

When the DATA IN is input to the flip-flop 1110 as the INPUT DATA, the bit and clock controller 1140 receives clock pulses CLK and generates a CONTROL SIGNAL and a clock signal CLK OUT as much as a corresponding time to 1 bit of the input data, in which the CLK OUT is applied to flip-flop 1110 and CONTROL SIGNAL is used for clearing the counter 1120 when the 1 bit is finished.

The counter 1120 counts each high state of the FLIP-FLOP OUTPUT of the flip-flop 1110, and the comparator 1130, in this time, compares a counting value counted by the counter 1120 during the corresponding time of the 1 bit, with the reference value of the majority register 1150. If the compared counting value is high, the comparator 1130 outputs a high state REAL DATA, while, if the compared counting value is same or small, the comparator 1130 outputs a low state REAL DATA. FIG. 11B shows the low and high state outputs of the comparator 1130 as the REAL DATA being output from the signal distortion corrector 840.

To extract the REAL DATA from the output data of the signal distortion corrector 840, the synchronizing and header information should be detected and the value provided from the transmitting party should be exact in the synchronizing information. If an error occurs in the synchronizing information, the extraction of the real data is impossible. The header information includes 2 bits and if the information value is "00", this information is managed as a virtual information not the real data and just the value excepting "00" is managed as the real data.

The SS modem according to the present invention is a communication structure of a time compression multiplexing (TMC) system, which is also known as a ping pong system in the art, and is divided into a master and a slave. The master may be the SS Modem 121 of the scanner 120 and the slave may be the SS Modem of the subscriber terminal 110. The TMC system is, that the slave sends also the information when the master sends the information, and determination for information effect is made according to the header information used on the transmitting format. That is, the header information is managed as the virtual data not the real data if the header information is 0,0. This virtual data is the data generated from itself of the SS modem 121, not the data transmitted from CPU 123, and the virtual data is not stored in the receiving buffer 890 of the receiving party. There is the reception information in the slave regardless of the virtual or real information and if there is the information in the transmitting buffer, the real data is transmitted. The header information, in this time, must be any one out of (0,1), (1,0) or (1,1) not (0,0). If there is no the information stored in the transmitting buffer, the slave transmits the virtual information including the header information of (0,0).

Therefore, the master makes a period transmitted the information, as a master synchronization, which is decided according to a regular period, namely which is decided by the time capable of receiving the information to be received after transmitting. If the master transmits the data according to the time, the slave is received after a delay time occurring actually on the transmitting line. If there is this reception, the slave transmits the data after the regular time, and if the data is received, the master again transmits the data, matching to the following frame namely to the master synchronization.

It is described for operation of the header and synchronizing searcher 850 as follows, referring to FIG. 12.

The first shift register 1250 and the second shift register 1210 store the input data each 4 bits and 2 bits.

The comparator 1260 compares the data stored in the first shift register 1250 with the synchronizing data and outputs the synchronizing comparing data showing the result.

The register 1220 temporarily stores the data stored in the second shift register 1210, corresponding to the synchronizing comparing data.

The comparator 1230 inputs the header data and the storage data of the register 1220 to compare the two input data (the storage data and the header data) and outputs the header comparing data showing the result.

The data detector 860 removes the synchronizing and header data and outputs 4k data, if the header and synchronizing data are detected from the 4j data.

The exclusive-OR logic 870 as a de-spreading means despreads the 4k data by the PN code input from the PN code generator 260 and outputs a 4m data. It may be impossible to extract the data if the PN values of the transmitting party and of the receiving party are different.

The error corrector 880 separates the de-spread 4m data into 4n and 40 data of respective 7 bits and performs the error correction according to the error code within the input data 4n and 4o. The error corrector 880 corrects the information error of the respective 7 bits and outputs 4p and 4q data of respective 4 bits. The 4p and 4q data are converted into 4r data as a parallel data and thereafter, is stored in the receiving buffer 890.

The receiving buffer 890, then, informs CPU 123 of a received state of the data through a status or an interrupter so that the data is read out.

As disclosed above, therefore, the present invention has such advantages that a bidirectional communication is available without having influence upon the voice speech service and that a crosstalk can be minimized, since the data is transmitted by using the band-spread frequency band not a specific frequency, in the band (over 20 KHz) separated from the voice speech band.

Furthermore, the present invention may raise a security reliability of the remote information processing data as there is itself privacy function according to the spread spectrum communication system.

What is claimed is:

1. A data modulator-demodulator apparatus of a spread spectrum communication system, comprising:
   pseudo noise code generating means for generating a pseudo noise code;
   control means for producing a timing control signal for controlling modulation and demodulation timing of transmission data and reception data, respectively;
   modulating means for receiving said timing control signal, for generating spread spectrum data to be transmitted in synchronism with said tinting control signal by band-spreading real data with said pseudo noise code, and for outputting said spread spectrum data as transmission modulation data containing prescribed reception information;

transmission conversion means for converting said transmission modulation data into an analog information signal and for transmitting the analog information signal through a transmitting line;

reception conversion means for receiving through said transmitting line a received analog information signal, for outputting an operation clock by extracting an initial clock from said received analog information signal, and for converting said received analog information signal into digital reception data; and demodulating means for receiving said operation clock, said timing control signal and said pseudo noise code for generating demodulation data by removing prescribed reception information from said digital reception data and band de-spreading the digital reception data in response to said operation clock, said timing control signal and said pseudo noise code.

2. A data modulator-demodulator apparatus as claimed in claim 1, wherein said modulating means comprises:

error code generating means for generating an error correction code from the real data to be transmitted and for combining said error correction code with said real data to output said real data containing said error correction code serially;

spectrum spreading means for receiving the combination of error correction code and real data output from said error code generating means, and for band-spreading said combination of error correction code and real data in response to said pseudo noise code to output said spread spectrum data;

transmission data combination means for combining said spread spectrum data with said prescribed reception information in synchronism with said timing control signal from said control means, said prescribed reception information being indicative of a start of real data within a transmitting signal and being comprised of synchronizing data, header data and said initial clock; and line coding means for line coding said combination of spread spectrum data and prescribed reception information to avoid a continuous transmission of duplicate data, and for outputting said transmission modulation data.

3. A data modulator-demodulator apparatus as claimed in claim 2, wherein said line coding means comprises:

an exclusive-NOR gate for coding said combination of spread spectrum data and prescribed reception information in synchronism with said timing control signal for output as said transmission modulation data, said exclusive-NOR gate having a first input for receiving said combination of spread spectrum data and prescribed reception information and a second input for receiving said timing control signal.

4. A data modulator-demodulator apparatus as claimed in claim 1, wherein said demodulating means comprises:

clock detecting means for generating a reception control signal indicating a start of said digital reception data received from said reception conversion means;

reception data control means for outputting said digital reception data in response to said reception control signal;

line decoding means for receiving said digital reception data output from said reception data control means, and for line-decoding said digital reception data in synchronism with said timing control signal for ouputting line decoded data;

signal distortion correction means for storing a prescribed reference value, and for correcting a distortion of said line decoded data in comparison with said prescribed reference value for outputting corrected reception data;

reception information detecting means for receiving the corrected reception data from said signal distortion correction means, and for detecting said prescribed reception information within said corrected reception data to output a detection result;

data detecting means for removing said prescribed reception information from said corrected reception data output by said signal distortion correction means in response to said detection result, and for providing output data devoid of said prescribed reception information;

de-spreading means for inputting said output data from said data detecting means, and for de-spreading said output data in response to said pseudo noise code to output de-spreaded data; and error correction means for receiving said de-spreaded data, for correcting for data reception error according to an error correction code within said de-spreaded data for outputting demodulated data.

5. A data modulator-demodulator apparatus as claimed in claim 4, wherein said line decoding means comprises:

an exclusive-NOR gate having a first input for receiving said digital reception data, a second input for receiving said timing control signal and an output for ouputting said line decoded data.

6. A data modulator-demodulator apparatus as claimed in claim 4, wherein said reception data control means comprises:

AND logic means having a first input for receiving said operation clock, a second input for receiving said digital reception data output from said reception conversion means said operation clock indicating a start of said digital reception data.

7. A data modulator-demodulator apparatus as claimed in claim 4, wherein said signal distortion correction means comprises:

a bit and clock controller for receiving said timing control signal and for generating a control signal and a clock signal;

a flip-flop having a data input for receiving said line decoded data output from said line decoding means and a clock input for receiving said clock signal ouput from said bit and clock controller;

a counter for counting logic high data output from said flip-flop for outputting a counting value, said counter being reset by said control signal output from said bit and clock controller;

a majority register having stored therein said prescribed reference value; and a comparator for comparing said counting value output from said counter with the prescribed reference value from said majority register, said comparator outputting, as said corrected reception data, a high logic value when the compared counting value is higher than said prescribed reference value and a low logic value when the compared counting value is equal to or less than said prescribed reference value.

8. A data modulator-demodulator apparatus as claimed in claim 1, wherein said transmission conversion means comprises:
   a transmitting filter for inputting said transmission modulation data and for converting said transmission modulation data into an analog information signal to output a signal; and
   transmission gain control means for inputting the signal output from said transmitting filter and for varying a size of the output signal.

9. A data modulator-demodulator apparatus as claimed in claim 8, wherein said transmitting filter comprises:
   a first high-pass filter for coupling a DC component after inputting a transmission modulation data signal and for removing a low frequency component;
   a low-pass filter for inputting an output signal of said first high-pass filter and for removing a high frequency component; and
   a second high-pass filter for inputting an output of said low-pass filter and for preventing a digital component in said output of said low-pass filter from being passed to a voice band.

10. A data modulator-demodulator apparatus as claimed in claim 1, wherein said reception conversion means comprises:
    a receiving filter for filtering a signal component from the analog information signal received;
    slope correction means for outputting a slope-corrected output signal by correcting a slope of the signal filtered by said receiving filter;
    amplifying means for outputting said operation clock by recovering said initial clock from said slope-corrected output signal;
    level conversion means for converting said operation clock into a TTL level, and for outputting the operation clock having said TTL level; and
    bit slice means for inputting said slope-corrected output signal, for converting the slope-corrected output signal input into a TTL level signal corresponding to a change of said slope-corrected output signal, and for outputting the TTL level signal as said reception data.

11. A data modulator-demodulator apparatus as claimed in claim 10 wherein said receiving filter comprises:
    first, second and third high pass filters connected in series for removing a voice band from the analog information signal, said first high pass filter being coupled to said transmitting line; and
    first and second lowpass filters serially connected between said third high pass filter and said slope correction means for removing a high frequency component from said analog information signal passed by said first, second and third high pass filters.

12. A data modulator-demodulator apparatus of a spread spectrum communication system comprising:
    pseudo noise code generating means for generating a pseudo noise code;
    control means for outputting a timing control signal which controls modulation and demodulation timing of transmission and reception data;
    error code generating means for generating an error correction code from real data to be transmitted and for combining said error correction code with said real data to output data including said real data and said error correction code serially;
    pseudo noise code combination means for inputting said data including said real data and said error correction code output from said error code generating means, and for band spreading said real data after inputting the pseudo noise code generated by said pseudo noise code generating means to output band-spread data;
    transmission data combination means for inputting said band-spread data, and for generating combined data by combining said band-spread data with reception information, said reception information providing an indication of data existence within a transmitting signal, said reception information being comprised of synchronization data and header data, in synchronism with the timing control signal received from said control means;
    line coding means for inputting and line-coding said combined data generated by said transmission data combination means to avoid a continuous transmission of duplicate data, and for outputting transmission modulation data;
    a transmitting filter for inputting said transmission modulation data output by said line coding means and for converting said transmission modulation data into an analog information signal;
    transmission gain control means for inputting the analog information signal output from said transmitting filter and for varying a size of the output signal;
    a receiving filter for filtering a signal component from a received analog information signal to generate a filtered signal;
    slope correction means for correcting a slope of the filtered signal to generate a slope corrected signal;
    level conversion means for inputting said slope corrected, for amplifying said slope corrected for generating an amplified signal, and for outputting an operation clock by converting said amplified signal into a TTL level;
    bit slice means for inputting said slope corrected signal, for converting the slope corrected signal input into a TTL signal corresponding to a change of said slope corrected signal, and for outputting the TTL signal as digital reception data;
    initial clock detecting means for detecting a start of the digital reception data, after inputting said operation clock, and for generating a reception control signal for controlling data reception;
    reception data control means for inputting said digital reception data and for controlling an output of the digital reception data in response to said reception control signal;
    line decoding means for inputting and line-decoding said digital reception data, output by said reception data control means, in synchronism with said timing control signal for outputting a line decoded signal;
    signal distortion correction means for storing a prescribed reference value, and for correcting a distortion of the line decoded signal in comparison with said prescribed reference value after inputting said line decoded signal for generating corrected reception data;
    reception information detecting means for inputting the corrected reception data generated by said signal distortion correction means and for detecting the reception information within said corrected reception data to output a detecting result;

data detecting means for removing the reception information from said corrected reception data in response to said detecting result output by said reception information detecting means, and for generating first output data indicative of said corrected reception data having said reception information removed therefrom;

de-spreading means for inputting said first output data generated by said data detecting means, and for generating second output data by de-spreading said first output data in response to the pseudo noise code generated by said pseudo noise code generating means; and error correction means for inputting said second output data, and for generating reception demodulation data by correcting for data reception error in response to the error correction code within said second output data.

13. A data modulator-demodulator apparatus as claimed in claim 12, wherein said line coding means comprises:

an exclusive-NOR gate for coding said combined data in synchronism with said timing control signal for output as said transmission modulation data, said exclusive-NOR gate having a first input for receiving said combined data and a second input for receiving said timing control signal.

14. A data modulator-demodulator apparatus as claimed in claim 12, wherein said transmitting filter comprises:

a first high-pass filter for removing a low frequency component from the transmission modulation data;

a low-pass filter for inputting an output signal of said first high-pass filter and for removing a high frequency component; and a second high-pass filter for generating said analog information signal by inputting an output of said low-pass filter and by removing a digital component from said output of said low-pass filter to prevent said digital component from being passed to a voice band.

15. A data modulator-demodulator apparatus as claimed in claim 12, wherein said receiving filter comprises:

first, second and third high pass filters connected in series for removing a voice band from the received analog information signal, said first high pass filter being coupled to a transmitting line; and first and second lowpass filters serially connected between said third high pass filter and said slope correction means for removing a high frequency component from said received analog information signal passed by said first, second and third high pass filters.

16. A data modulator-demodulator apparatus as claimed in claim 12, wherein said reception data control means comprises:

AND logic means having a first input for receiving said operation clock, a second input for receiving the digital reception data output from said bit slice means, said AND logic means outputting said digital reception data in response to said operation clock.

17. A data modulator-demodulator apparatus as claimed in claim 12, wherein said line decoding means comprises:

an exclusive-NOR gate having a first input for receiving said digital reception data output from said reception data control means, a second input for receiving said timing control signal and an output for outputting said line decoded signal.

18. A data modulator-demodulator apparatus as claimed in claim 12, wherein said signal distortion correction means comprises:

a bit and clock controller for receiving said tinning control signal and for generating a control signal and a clock signal;

a flip-flop having a data input for receiving said line decoded signal output from said line decoding means and a clock input for receiving said clock signal output from said bit and clock controller;

a counter for counting logic high data output from said flip-flop for outputting a counting value, said counter being reset by said control signal output from said bit and clock controller;

a majority register having stored therein said prescribed reference value; and a comparator for comparing said counting value output from said counter with the prescribed reference value from said majority register, said comparator outputting, as said corrected reception data, a high logic value when the compared counting value is higher than said prescribed reference value and a low logic value when the compared counting value is equal to or less than said prescribed reference value.

19. A data modulator-demodulator apparatus of a spread spectrum communication system, comprising:

pseudo noise code generating means for generating a pseudo noise code;

control means for producing a timing control signal for controlling modulation and demodulation timing of transmission data and reception data, respectively;

modulating means for receiving said timing control signal, for generating spread spectrum data to be transmitted in synchronism with said timing control signal by band-spreading real data with said pseudo noise code, and for outputting said spread spectrum data as transmission modulation data containing prescribed reception information;

transmission conversion means for converting said transmission modulation data into an analog information signal and for transmitting the analog information signal through a transmitting line;

reception conversion means for receiving through said transmitting line a received analog information signal, for outputting an operation clock by extracting an initial clock from said received analog information signal, and for converting said received analog information signal into digital reception data, wherein said reception conversion means comprises:

a receiving filter for filtering a signal component from the analog information signal received;

slope correction means for outputting a slope-corrected output signal by correcting a slope of the signal filtered by said receiving filter;

amplifying means for outputting said operation clock by recovering an initial clock from said slope-corrected output signal;

level conversion means for converting said operation clock into a TTL level, and for outputting the operation clock having said TTL level; and bit slice means for inputting said slope-corrected output signal, for converting the slope-corrected output signal input into a TTL level signal corresponding to a change of said slope-corrected output signal, and for outputting the TTL level signal as said reception data; and demodulating means for receiving said operation clock, said timing control signal and said pseudo noise code for generating demodulation data by removing prescribed reception information from said digital reception data and band de-spreading the digital reception data in response to said operation clock, said timing control signal and said pseudo noise code.

20. A data modulator-demodulator apparatus as claimed in claim 19, wherein said receiving filter comprises:

first, second and third high pass filters connected in series for removing a voice band from the analog information signal, said first high pass filter being coupled to said transmitting line; and first and second lowpass filters serially connected between said third high pass filter and said slope correction means for removing a high frequency component from said analog information signal passed by said first, second and third high pass filters.

* * * * *